United States Patent
Hayman et al.

(10) Patent No.: US 12,229,777 B1
(45) Date of Patent: Feb. 18, 2025

(54) METHOD AND SYSTEM FOR DETECTING FRAUDULENT TRANSACTIONS IN INFORMATION TECHNOLOGY NETWORKS

(71) Applicant: Intuit Inc., Mountain View, CA (US)

(72) Inventors: Liron Hayman, Hod HaSharon (IL); Uri Lapidot, Hod Hasharon (IL); Gabriel Goldman, Hod Hasharon (IL); Yaron Moshe, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 786 days.

(21) Appl. No.: 16/290,186

(22) Filed: Mar. 1, 2019

(51) Int. Cl.
  *G06Q 20/40* (2012.01)
  *G06F 18/243* (2023.01)
  *G06F 21/52* (2013.01)
  *G06N 20/00* (2019.01)

(52) U.S. Cl.
  CPC ... *G06Q 20/4016* (2013.01); *G06F 18/24317* (2023.01); *G06F 21/52* (2013.01); *G06N 20/00* (2019.01)

(58) Field of Classification Search
  CPC .... G06Q 20/4016; G06N 20/00; G06F 21/52; G06K 9/6281
  See application file for complete search history.

(56) References Cited

U.S. PATENT DOCUMENTS

| | | | | |
|---|---|---|---|---|
| 5,819,226 A * | 10/1998 | Gopinathan | ........... | G06Q 20/00 705/44 |
| 6,330,546 B1 * | 12/2001 | Gopinathan | ........... | G06Q 20/00 705/35 |
| 10,204,374 B1 * | 2/2019 | Holan | ................ | G06Q 30/0637 |
| 10,460,320 B1 * | 10/2019 | Cao | ........................ | G06N 20/00 |
| 10,509,997 B1 * | 12/2019 | Gupta | .................... | G06N 3/063 |
| 10,672,005 B1 * | 6/2020 | Hart | ........................ | G06N 20/00 |
| 10,706,423 B1 * | 7/2020 | Kuo | ........................ | G06N 5/003 |
| 2002/0099649 A1 * | 7/2002 | Lee | .................... | G06Q 20/4016 705/38 |

(Continued)

OTHER PUBLICATIONS

Ravelin, Why Machine Learning for Fraud Detection?, 2018, available at https://merchantriskcouncil.org/resource-center/whitepapers/2018/why-machine-learning-for-fraud-detection, 10 pages. (Year: 2018).*

(Continued)

*Primary Examiner* — Jay Huang
(74) *Attorney, Agent, or Firm* — Lathrop GPM LLP

(57) ABSTRACT

A method for detecting fraudulent financial transactions in information technology networks involves obtaining a multitude of features associated with a financial transaction conducted over an information technology network by an unknown transaction party. The multitude of features includes clickstream data obtained from the unknown transaction party. The clickstream data is associated with data of the financial transaction being entered by the unknown transaction party. The method further involves obtaining a first fraud indicator using a machine learning classifier operating on the multitude of features, obtaining a second fraud indicator using a rule-based classifier operating on the multitude of features, obtaining a fraud prediction for the financial transaction, using the first fraud indicator and the second fraud indicator, and taking an action, in response to the fraud prediction.

19 Claims, 10 Drawing Sheets

(56) References Cited

U.S. PATENT DOCUMENTS

| | | | | |
|---|---|---|---|---|
| 2002/0133721 | A1* | 9/2002 | Adjaoute | G06Q 20/4016 726/23 |
| 2002/0194119 | A1* | 12/2002 | Wright | G06Q 30/0609 705/38 |
| 2003/0069820 | A1* | 4/2003 | Hillmer | G06Q 20/4016 705/35 |
| 2004/0230530 | A1* | 11/2004 | Searl | G06F 21/552 705/51 |
| 2005/0102292 | A1* | 5/2005 | Tamayo | G06F 16/951 |
| 2005/0154676 | A1* | 7/2005 | Ronning | G06Q 30/0601 705/44 |
| 2005/0188080 | A1* | 8/2005 | Motsinger | H04L 67/22 709/224 |
| 2007/0239604 | A1* | 10/2007 | O'Connell | G06Q 20/4016 705/50 |
| 2007/0239606 | A1* | 10/2007 | Eisen | G06Q 20/3674 705/51 |
| 2008/0162202 | A1* | 7/2008 | Khanna | G06Q 20/10 705/14.47 |
| 2009/0307028 | A1* | 12/2009 | Eldon | G06Q 30/06 705/37 |
| 2014/0164178 | A1* | 6/2014 | Adjaoute | G06Q 30/0609 705/26.35 |
| 2014/0279753 | A1* | 9/2014 | Dalessandro | G06N 5/02 706/12 |
| 2015/0026027 | A1* | 1/2015 | Priess | G06Q 20/4016 705/35 |
| 2015/0039513 | A1* | 2/2015 | Adjaoute | H04L 63/1425 705/44 |
| 2015/0046216 | A1* | 2/2015 | Adjaoute | G06Q 20/384 705/7.29 |
| 2015/0046332 | A1* | 2/2015 | Adjaoute | G06N 20/00 705/44 |
| 2015/0310196 | A1* | 10/2015 | Turgeman | G06F 3/04842 726/19 |
| 2016/0189210 | A1* | 6/2016 | Lacey | G06N 7/005 705/7.31 |
| 2016/0253598 | A1* | 9/2016 | Yamada | G06N 20/00 706/12 |
| 2016/0253672 | A1* | 9/2016 | Hunter | G06Q 20/4016 705/39 |
| 2017/0054702 | A1* | 2/2017 | Turgeman | G06F 3/04883 |
| 2017/0085587 | A1* | 3/2017 | Turgeman | G06F 3/03547 |
| 2017/0193526 | A1* | 7/2017 | Turgeman | G06Q 20/401 |
| 2017/0353477 | A1* | 12/2017 | Faigon | G06F 21/6209 |
| 2018/0103047 | A1* | 4/2018 | Turgeman | H04L 63/08 |
| 2018/0182029 | A1* | 6/2018 | Vinay | G06N 20/00 |
| 2018/0349583 | A1* | 12/2018 | Turgeman | G06F 21/554 |
| 2019/0220863 | A1* | 7/2019 | Novick | H04W 12/122 |
| 2019/0279218 | A1* | 9/2019 | Adjaoute | G06N 5/043 |
| 2020/0058025 | A1* | 2/2020 | Raw | G06Q 20/407 |
| 2020/0058030 | A1* | 2/2020 | Adjaoute | G06N 20/00 |
| 2020/0226460 | A1* | 7/2020 | Bruss | G06Q 20/16 |
| 2020/0327551 | A1* | 10/2020 | Ji | G06Q 20/403 |
| 2021/0042664 | A1* | 2/2021 | Wang | G06K 9/6262 |

OTHER PUBLICATIONS

Ravelin, MRC Webinar: How Machine Learning Has Changed Fraud Detection Forever, Oct. 4, 2018, YouTube.com, available at https://youtu.be/aOvkbivH6Rs. (Year: 2018).*

Ravelin, Podcast, How machine learning can be used to prevent online fraud, Nov. 23, 2017, SoundCloud.com, available at https://soundcloud.com/ravelin. (Year: 2017).*

Ravelin, Podcast, Ravelin's data scientist on machine learning for fraud detection, Jul. 4, 2018, SoundCloud.com, available at https://soundcloud.com/ravelin. (Year: 2018).*

Gerry Carr, How Machine Learning Helps with Fraud Detection, Oct. 22, 2016, RTInsights.com, available at https://www.rtinsights.com/online-payments-fraud-detection-machine-leaning/. (Year: 2016).*

Ravelin, web page <www.ravelin.com>, Feb. 25, 2019, retrieved from Internet Archive Wayback Machine <https://web.archive.org/web/20190225195448/https://www.ravelin.com/> on Oct. 21, 2020. (Year: 2019).*

Tobias Weller, Compromised Account Detection Based on Clickstream Data, WWW '18: Companion Proceedings of the the Web Conference 2018, Lyon, France, Apr. 23-27, 2018, pp. 819-823 (5 pages). (Year: 2018).*

J. O. Awoyemi, et al., Credit card fraud detection using machine learning techniques: A comparative analysis, 2017 International Conference on Computing Networking and Informatics (ICCNI), Lagos, Oct. 29-31, 2017, pp. 1-9 (9 pages). (Year: 2017).*

RTI and IBM, Clickstream Analytics Takes Applications to the Next Level, Feb. 6, 2019, available at https://532386f9a72d1dd857a8-41058da2837557ec5bfc3b00e1f6cf43.ssl.cf5.rackcdn.com/wp-content/uploads/2019/02/IBM-RTI-eBookClickstreamAnalytics.pdf?rti1. (Year: 2019).*

Sebastian Raschka, What is the Difference Between a Classifier and a Model?, https://sebastianraschka.com/faq/docs/difference_classifier_model.html, archived Jan. 10, 2016 at https://web.archive.org/web/20160110031423/https://sebastianraschka.com/faq/docs/difference_classifier_model.html, 2 pages. (Year: 2016).*

Ravelin, Machine Learning for Fraud Detection, www.ravelin.com/insights/machine-learning-for-fraud-detection, archived May 13, 2020 at https://web.archive.org/web/20200513141609/https://www.ravelin.com/insights/machine-learning-for-fraud-detection, 26 pages. (Year: 2020).*

Jason Brownlee, Making Predictions with Sequences, Machine Learning Mastery, https://machinelearningmastery.com/sequence-prediction/, dated Sep. 4, 2017, first archived Sep. 7, 2018 at https://web.archive.org/web/20180907185639/https://machinelearningmastery.com/sequence-prediction/, 24 pages. (Year: 2017).*

Jason Brownlee, Loss and Loss Functions for Training Deep Learning Neural Networks, Machine Learning Mastery, Jan. 28, 2019, https://machinelearningmastery.com/loss-and-loss-functions-for-training-deep-learning-neural-networks/, 26 pages. (Year: 2019).*

* cited by examiner

400
List of Transaction Features

| Feature Class | 402 | Feature | 404 | Data Type | 406 |
|---|---|---|---|---|---|
| User agent derived features | 402A | IP_address_is_proxy | | Boolean | |
| | | IP_address_is_data_center | | Boolean | |
| | | IP_address_country | | Categorical | |
| | | IP_address_city | | Categorical | |
| | | IP_address_longitude | | float | |
| | | IP_address_latitude | | float | |
| | | previous_logins_from_IP | | boolean | |
| | | origin_payment_time | | timestamp | |
| | | device ID | | string | |
| | | browser name | | string | |
| | | Operating System | | Categorical | |
| | | browser version | | string | |
| Invoice related features | 402B | Amount | | float | |
| | | Currency | | Categorical | |
| | | Date | | timestamp | |
| | | Service Rendered | | Categorical | |
| | | Industry | | Categorical | |
| | | Name on Invoice | | string | |
| Payment related features | 402C | Name of payer | | string | |
| | | Name of payer == name on invoice | | boolean | |
| | | Date | | timestamp | |
| Clickstream data | 402D | copy/paste CC | | boolean | |
| | | time spent on page | | float | |
| | | number of payer attempts to pay | | integer | |

*FIG. 4*

820
Payment Page

*FIG. 8C*

METHOD AND SYSTEM FOR DETECTING FRAUDULENT TRANSACTIONS IN INFORMATION TECHNOLOGY NETWORKS

BACKGROUND

Information technology networks may be used to perform transactions such as the exchange of information or funds. A party participating in a transaction may not necessarily be authenticated for the purpose of the transaction. Accordingly, a dishonest party may attempt to perform a fraudulent transaction over the information technology network without necessarily risking being held liable for the fraudulent transaction. Accordingly, to reduce fraudulent transactions performed using the information technology network, it may be desirable to assess whether transactions are legitimate or fraudulent, especially when involving parties whose identities are not readily verifiable. Based on whether a transaction is considered legitimate or fraudulent, the transaction may then be permitted or rejected, respectively.

SUMMARY

In general, in one aspect, one or more embodiments relate to a method for detecting fraudulent transactions. The method includes obtaining a multitude of features associated with a financial transaction conducted over an information technology network by an unknown transaction party. The multitude of features comprises clickstream data obtained from the unknown transaction party. The clickstream data is associated with data of the financial transaction being entered by the unknown transaction party. The method further includes obtaining a first fraud indicator using a machine learning classifier operating on the multitude of features, obtaining a second fraud indicator using a rule-based classifier operating on the multitude of features, obtaining a fraud prediction for the financial transaction, using the first fraud indicator and the second fraud indicator, and taking an action, in response to the fraud prediction.

In general, in one aspect, one or more embodiments relate to a system for detecting fraudulent transactions. The system includes a computer processor, and a feature collection interface executing on the computer processor configured to obtain a multitude of features associated with a financial transaction conducted over an information technology network by an unknown transaction party. The multitude of features includes clickstream data obtained from the unknown transaction party. The clickstream data is associated with data of the financial transaction being entered by the unknown transaction party. The system further includes a transaction assessment engine executing on the computer processor configured to obtain a first fraud indicator using a machine learning classifier operating on the multitude of features, obtain a second fraud indicator using a rule-based classifier operating on the multitude of features, obtain a fraud prediction for the financial transaction, using the first fraud indicator and the second fraud indicator; and take an action, in response to the fraud prediction.

In general, in one aspect, one or more embodiments relate to a non-transitory computer readable medium including computer readable program code for causing a computer system to obtain a multitude of features associated with a financial transaction conducted over an information technology network by an unknown transaction party. The multitude of features includes clickstream data obtained from the unknown transaction party. The clickstream data is associated with data of the financial transaction being entered by the unknown transaction party. The computer readable program code further causes the computer system to obtain a first fraud indicator using a machine learning classifier operating on the multitude of features, obtain a second fraud indicator using a rule-based classifier operating on the multitude of features, obtain a fraud prediction for the financial transaction, using the first fraud indicator and the second fraud indicator, and take an action, in response to the fraud prediction.

Other aspects of the disclosure will be apparent from the following description and the appended claims.

BRIEF DESCRIPTION OF DRAWINGS

FIG. 4 shows transaction features in accordance with one or more embodiments of the disclosure.

FIGS. 8A, 8B, and 8C show example views of user interfaces for performing transactions, in accordance with one or more embodiments of the disclosure.

DETAILED DESCRIPTION

Figure 1:
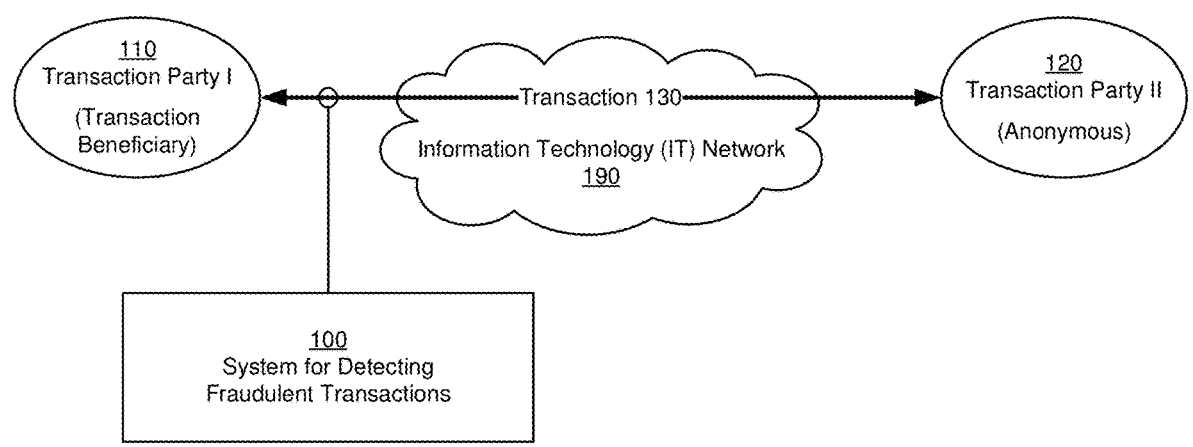
FIGS. 1 and 2 show systems for detecting fraudulent transactions, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Information technology networks may be used to perform transactions such as the exchange of information or funds. A party participating in a transaction may not necessarily be authenticated for the purpose of the transaction. Accordingly, a dishonest party may attempt to perform a fraudulent transaction over the information technology network without necessarily risking being held liable for the fraudulent transaction. Embodiments of the disclosure assess whether a transaction is legitimate or fraudulent based on various features associated with the transaction. Based on whether the transaction is found to be legitimate or fraudulent, the transaction may then be permitted or blocked, respectively. More specifically, embodiments of the disclosure use the combination of a machine learning classifier and a rule-based classifier, operating on a set of features to determine whether a financial transaction may be fraudulent. A decision regarding whether a financial transaction is fraudulent or not is made based on the combined assessment of the financial transaction by the machine learning classifier and the rule-based classifier.

Turning to FIG. 1, a scenario is shown, in which a transaction (130) is performed between transaction party I (110) and transaction party II (120). In one or more embodiments of the disclosure, the transaction (130) is performed over an information technology (IT) network (190), and a system for detecting fraudulent transactions (100) is used to assess the transaction (130).

The transaction (130) may involve the exchange of information, funds, etc. In the illustration of FIG. 1, assume that transaction party I (110) is the recipient, i.e., the transaction beneficiary. Accordingly, it may be in the interest of transaction party I (110) to confirm that the transaction (130) is legitimate. Further assume that transaction party II (120) is anonymous or unknown, thus potentially complicating the verification of the transaction (130). The IT network (190), used for the transaction (130) may include wide area network segments (such as the Internet) and/or local area network segments and may allow secured and/or non-secured communications between transaction party I (110) and transaction party II (120). Transaction parties I and II (110, 120) may rely on computing devices similar to the computing system shown in FIG. 9 to perform the transaction (130). In one or more embodiments, the system for detecting fraudulent transactions (100) determines whether the transaction is fraudulent or legitimate, based on features associated with the transaction (130) and gathered by the system for detecting fraudulent transactions (100). Additional details are provided below with reference to the subsequently discussed figures.

Figure 2:
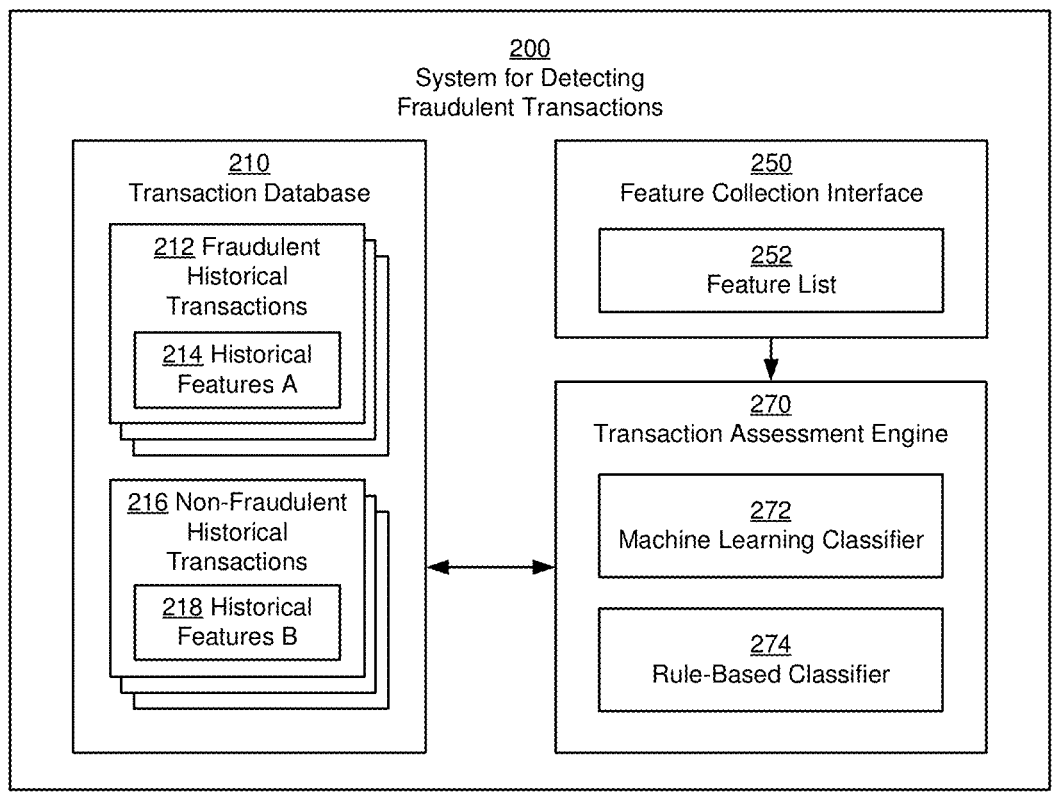

Turning to FIG. 2, a system for detecting fraudulent transactions (200), in accordance with one or more embodiments of the disclosure, is shown. The system for detecting fraudulent transactions (200) may include a transaction database (210), a feature collection interface (250), and a transaction assessment engine (270). Each of these components is subsequently described.

The transaction database (210), in accordance with one embodiment, includes historical ground truth data that may be used for training the algorithms to be used for classifying transactions. More specifically, the transaction database (210) includes historical data for fraudulent transactions (212) and non-fraudulent transactions (216). The fraudulent and non-fraudulent transactions (212, 216) may be based on previously assessed transactions, for which it is known whether fraud occurred. Known historical feature A (214) and historical feature B (218) may be associated with each of the fraudulent transaction (212) and non-fraudulent transaction (216). The historical ground truth data may, thus, be used to train algorithms that predict whether a transaction is fraudulent or not, based on features that are available for this transaction. A thorough discussion of the features is provided below with reference to FIG. 4.

The format and structure of the transaction database (210) may differ, depending on the stored transactions and features. For example, while FIG. 2 shows separate fraudulent transactions (212) and non-fraudulent transactions (216), the transaction database (210) does not necessarily keep fraudulent transactions and non-fraudulent transactions separate. Binary labels may instead be used to distinguish fraudulent and non-fraudulent transactions.

The transaction database (210) may be stored in non-volatile or volatile memory, e.g. on a hard disk drive or in RAM. The database may be central or distributed.

Figure 5:
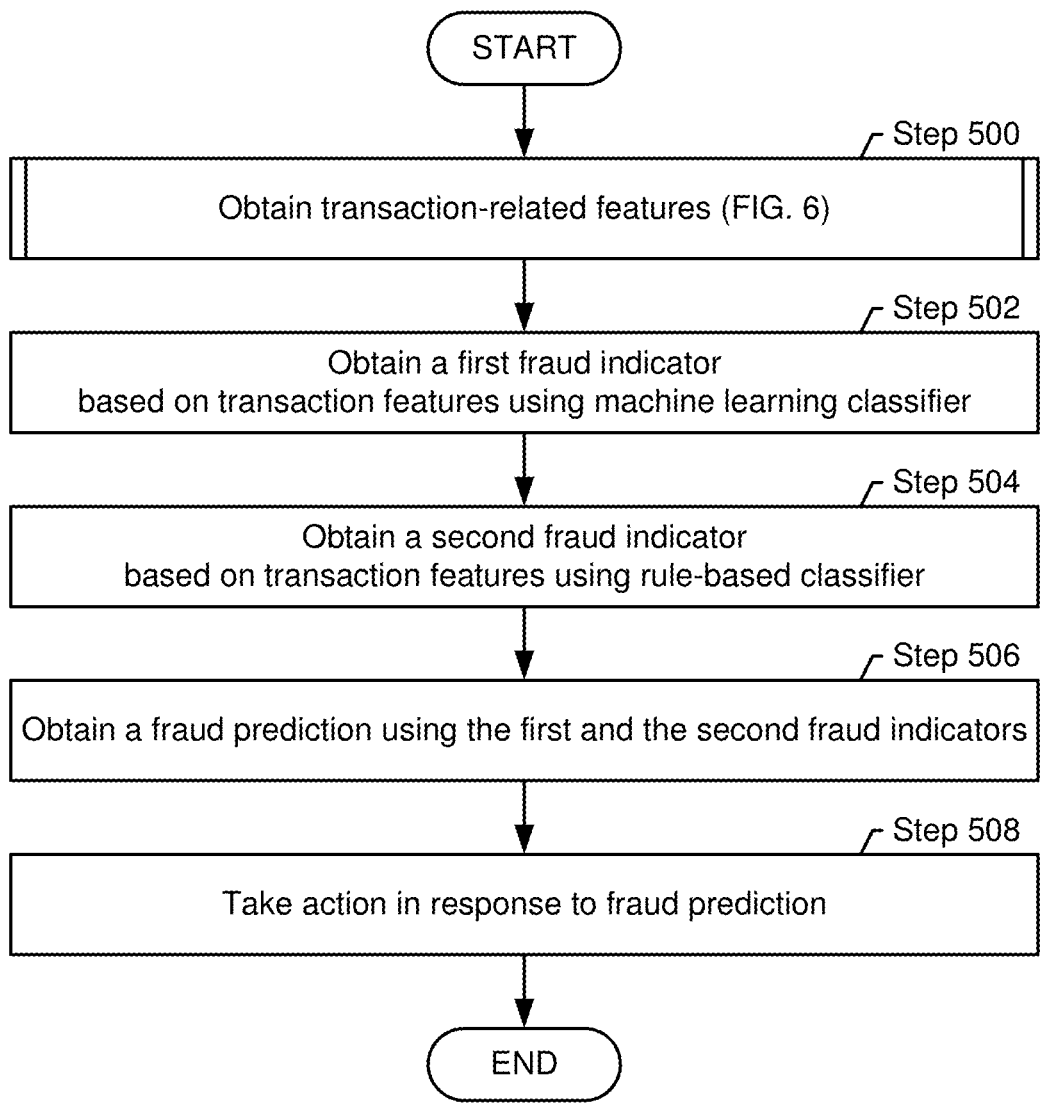
FIGS. 5, 6, and 7 show flowcharts describing the detection of fraudulent transactions, in accordance with one or more embodiments of the disclosure.
Figure 6:
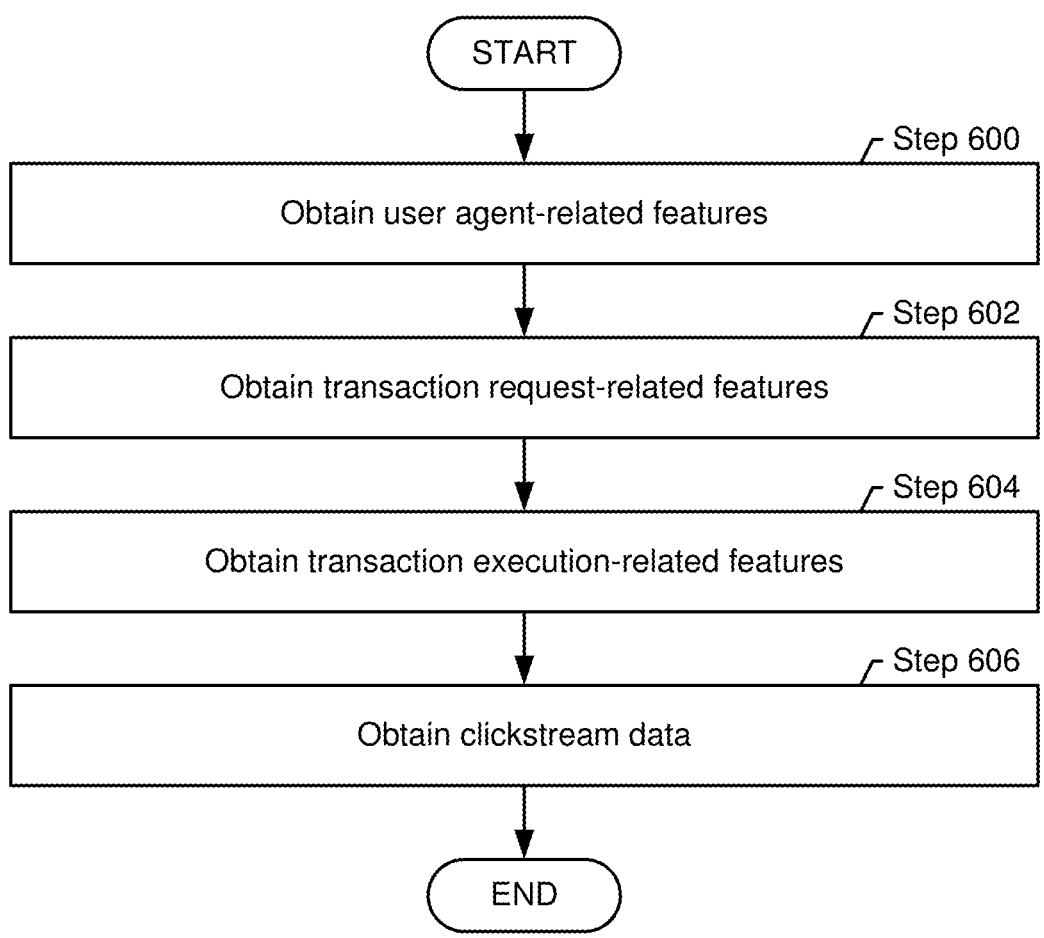

The feature collection interface (250), in accordance with one or more embodiments, includes a set of machine-readable instructions (stored on a computer-readable medium) which, when executed by a computing system, perform one or more of the operations described in the flowcharts of FIGS. 5 and 6. More specifically, the feature collection interface (250) may interface with one or more components of the IT network (190) to obtain the features associated with the transaction (130), to be used to determine whether the transaction (130) is fraudulent or not. The methods used for collecting the features is specific to the class of feature being collected, and a description is provided in FIG. 6, in a feature class-specific manner. The features to be collected may be specified in a feature list (252). An example of a feature list is provided in FIG. 4.

The transaction assessment engine (270), in accordance with one or more embodiments, includes a set of machine-readable instructions (stored on a computer-readable medium) which, when executed by a computing system, perform one or more of the operations described in the flowchart of FIG. 5. The transaction assessment engine (270) may include a machine learning classifier (272) and a rule-based classifier (274) used to predict whether a transaction is fraudulent, based on features received from the feature collection interface (250).

The machine learning classifier (272) may be, for example, decision tree, a random forest, a support vector machine, an XGBoost classifier, etc. In response to receiving a set of features associated with a transaction from the feature collection interface (250), the machine learning classifier (272) may classify the transaction as either fraudulent or non-fraudulent. The machine learning classifier (272) may further provide a confidence for the prediction. Prior to employing the machine learning classifier (272), the machine learning classifier may have been trained using a supervised learning approach. The training may be performed using historical data from the transaction database (210).

The rule-based classifier (274) may include one or more "if-then"-style rules that may have been manually set or automatically determined. The rule-based classifier may apply these rules to the set of features received from the feature collection interface to classify the associated transaction as either fraudulent or non-fraudulent. Prior to employing the rule-based classifier (274), the rules may have been established by an administrator.

Figure 7:
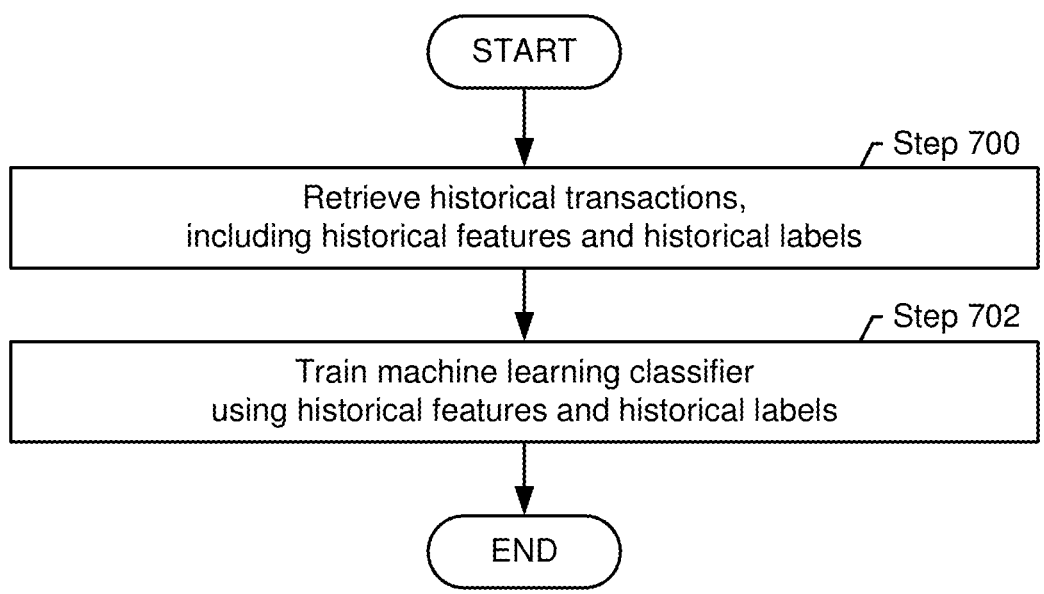

The operation of the machine learning classifier (272) and the rule-based classifier (274) are described in FIG. 5, and methods used for training the classifiers are described in FIG. 7. The transaction assessment engine (270) may be hosted on any type of computing system, e.g., a computing system similar to the computing system shown in FIGS. 9A and 9B.

While both the machine learning classifier (272) and the rule-based classifier (274) predict whether a transaction is fraudulent, there are differences between the two classifiers:

The machine learning classifier (272) typically operates on a significant number of features (e.g., tens or even hundreds of features), depending on the training of the machine learning classifier and/or the availability of features. The machine learning classifier (272) may change its predictive behavior as retraining is performed. No human expertise typically governs the predictive behavior of the machine learning classifier. In contrast, the rule-based classifier (274) may be governed by human expert knowledge or observation. For example, an administrator may spontaneously establish a rule when he or she observes patterns of features indicative of fraud. This rule may then remain static until the administrator decides to revise the rule. Typically, a rule or set of rules is based on relatively few features only, limited by humans' abilities to assess complexities associated with many features.

While FIG. 2 shows a configuration of components, other configurations may be used without departing from the scope of the disclosure. For example, various components may be combined to create a single component. As another example, the functionality performed by a single component may be performed by two or more components that may be communicatively connected using a network connection. In one or more embodiments of the disclosure, the system for detecting fraudulent transactions (200) is part of another system providing other functionalities. For example, the system for detecting fraudulent transactions (200), in a configuration that assesses electronic payments, may interface with a payment portal that processes credit cards. In some configurations, the prediction of fraud by the system for detecting fraudulent transactions (200) may be provided as a service that may be requested by users or by other services.

Figure 3:
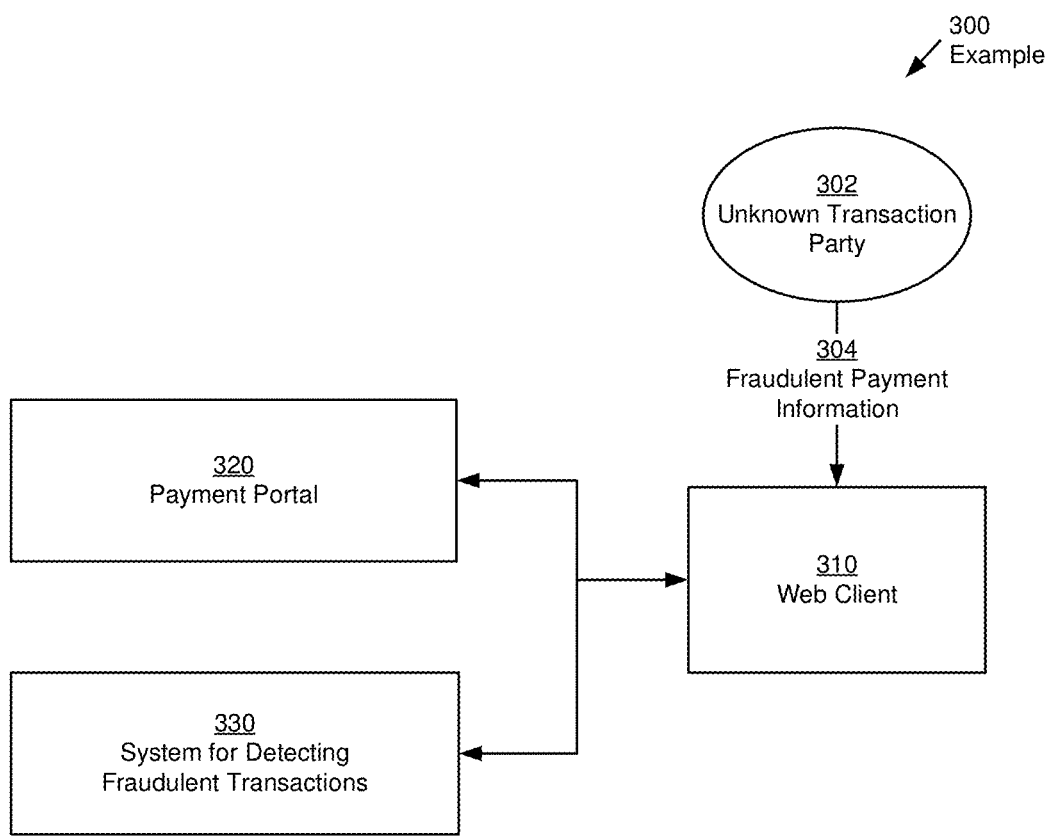
FIG. 3 shows an example implementation of a system for detecting fraudulent transactions, in accordance with one or more embodiments of the disclosure.

Turning to FIG. 3, an example implementation of a system for detecting fraudulent transactions, in accordance with one or more embodiments of the disclosure, is shown. The example illustrates the execution of an electronic payment by a payment portal (320) configured to process payments to a merchant or vendor. The payment portal is accessible via a web client (310). Assume that an unknown transaction party (302), i.e., a transaction party whose identity cannot be verified, is asked to make a payment. The request to make the payment may be provided to the unknown transaction party (302) in an email (see FIG. 8A for an example). The email may include a link, which when selected, initiates a payment process via the payment portal (320) (see FIGS. 8B and 8C for examples). The link may be accessed by any recipient of the email.

For example, the link may be forwarded to another party from an original recipient of the email. Accordingly, no information about the unknown transaction party (302) may initially be available. The payment process may be displayed to the unknown transaction party (302) in a web client (310) on a computing device accessed by the unknown transaction party (302). Assume that the unknown transaction party (302) enters fraudulent payment information (304), e.g., stolen credit card information. An undetected fraudulent payment, in this scenario, would have the potential to cause financial damage and may cause significant administrative efforts. Accordingly, the system for detecting fraudulent transactions (330) is used to assess the transaction including the fraudulent payment information (304), in accordance with one or more embodiments of the disclosure, prior to allowing completion of the transaction. In the example, the system for detecting fraudulent transactions (330) determines that the transaction is fraudulent and therefore blocks the transaction. The steps performed by the system for detecting fraudulent transactions to determine that the transaction is fraudulent are described in FIGS. 5, 6, and 7.

Turning to FIG. 4, an example of a list of transaction features (400), in accordance with one or more embodiments of the disclosure, is shown. The shown example is based on financial transactions. The content of the list may be different for other types of transactions. The list (400) includes transaction features (404) that are arranged by feature classes (402). Further a data type (406) is provided for each of the features (404). The feature classes (402) include user agent derived features (402A), invoice related features (402B), payment related features (402C), and clickstream data (402D).

User agent derived features (402A), in accordance with an embodiment of the disclosure, include features that may be obtained from a user agent such as a web client (310) or a portable device application accessed by a transaction party when performing a transaction. The features obtained by the user agent may include one or more network addresses, such as an IP address being used when performing the transaction, and additional features derived from the network address, such as a geographical location, latitude, longitude, etc. Further, additional features may be obtained based on the network address. For example, additional features may identify whether an address is a proxy, a data center, whether a login from the same network address was previously observed, etc. Additionally, identifiers different from network addresses, such as a device ID, a browser name, the payment time, etc., may be obtained. Those skilled in the art will appreciate that any type of identifier, associated with any component of the information technology network and that may help characterizing the unknown transaction party may be obtained. The user agent derived features (402A) may enable the machine learning classifier (272) and the rule-based classifier (274) to predict fraud. For example, the incidence of fraud may be particularly high in certain countries, an IP address may have been previously involved in a fraudulent transaction, a data center may be known for processing a significant volume of fraudulent transactions, etc.

Invoice related features (402B), in accordance with an embodiment of the disclosure, include features that may be obtained from an invoice for which a transaction is to be performed. The invoice related features may be obtained from a payment portal (320) or another invoice issuing service. The invoice related features may include data such as an invoice amount, a currency, an industry, services rendered, etc. These features may serve as indicators for fraud. For example, certain industries may be more frequently involved in fraudulent transactions than others, an amount may be typical for a fraudulent transaction, a name on the invoice may have been previously involved in a fraudulent transaction, etc.

Payment related features (402C), in accordance with an embodiment of the disclosure, include features that may be obtained by inspecting the payment information being provided when the transaction is initiated by the unknown transaction party (302). The name of the payer, whether the name of the payer matches the name on the invoice, the date of the transaction, etc., may be considered. For example, fraud may be assumed to be likely if the name of the payer is "John Doe", and/or if the name of the payer differs from the name on the invoice.

Clickstream data (402D), in accordance with an embodiment of the disclosure, includes tracked user activity, obtained from the web client (310) as the unknown transaction party (302) is interacting with the web client (310).

The clickstream data (402D) may document user actions such as the time spent on a particular page, whether payment information is manually entered or alternatively whether a copy & paste operation is used, etc. Fraud may be likely, for example, if a credit card number is entered using a copy & paste operation, because lists of stolen credit card numbers are known to be frequently processed using copy & paste operations for the purpose of making fraudulent payments. Similarly, repeated attempts to make a payment, potentially using a different credit card number each time, may also serve as an indicator for fraud. Accordingly, the clickstream data may serve as an indicator for whether entered financial data being entered is associated with a legitimate or fraudulent transaction.

Those skilled in the art will appreciate that FIG. 4 provides examples for features that are used in conjunction with financial transactions. The features shown in FIG. 4 may be used for fraud detection, for example in a configuration as illustrated in FIG. 3. Other features may be used for other types of transactions without departing from the disclosure. In one or more embodiments, one or more features (such as "IP_address_is_proxy", "IP_address_is_data_center", and geolocation-based features) are obtained from third party services that provide the appropriate analytics to obtain these features.

FIGS. 5, 6 and 7 show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 5, a method for detecting fraudulent transactions, in accordance with one or more embodiments of the disclosure, is shown. The method may be executed when the occurrence of a transaction is detected. In particular, the method may be executed prior to allowing the transaction under consideration to complete. In case of a payment transaction, the method may be executed prior to accepting the payment information provided by the unknown transaction party.

In Step 500, transaction-related features are obtained. The features to be obtained may be specified in a feature list. While it may be desirable to obtain as many of the features specified in the feature list as possible, not all features may always be obtainable. For example, referring to the list of features (400) of FIG. 4, assume that an IP address is collected as a feature. However, it may not be possible to unambiguously determine whether the IP address is associated with a data center or not. The feature "IP_address_is_data_center" may, thus, not be obtained. Accordingly, while the features to be obtained are guided by the feature list, the actually obtained features may differ from the features specified by the feature list. As previously discussed, features may fall into different classes such as user agent derived features, invoice related features, payment related features, clickstream data, and other classes of features, depending on the nature of the underlying transaction. The steps performed to obtain the transaction-related features may be specific to the class of the feature being obtained. Additional details are provided in FIG. 6.

After completion of Step 500, a collection of features related to the transaction to be assessed may be available for further processing. The obtained features may have various data types such as Boolean, categorical, float, time stamp, string, integer, etc.

In Step 502, a first fraud indicator is obtained based on the features obtained in Step 500, using a machine learning classifier. The machine learning classifier may be any type of classifier capable of making binary predictions such as a decision tree, a random forest, a support vector machine, an XGBoost classifier, etc. The machine learning classifier may accept the features obtained in Step 500 as inputs to make a prediction regarding the likeliness of fraud associated with the transaction under consideration. The input to the machine learning classifier may include some or all of the gathered features. The features may be processed to meet certain format requirements of the machine learning classifier. For example, the features may be grouped in a feature vector. The features to be included in the feature vector may have been established when the machine learning classifier was trained, as discussed below with reference to FIG. 7. The machine learning classifier may, however, also operate on the feature vector if the feature vector is incomplete, e.g., because certain features could not be obtained in Step 500. After completion of Step 502, a classification of the transaction under consideration as either fraudulent or non-fraudulent may be available. The classification may be provided as a likeliness of fraud. Based on the likeliness of fraud and a previously specified threshold, it may then be decided whether the machine learning classifier considers the transaction under consideration as fraudulent. In one or more embodiments, the ultimate decision regarding whether fraud is detected or not is, however, made based on the first fraud indicator under consideration of a second fraud indicator obtained by a rule-based classifier, as discussed below. Additional details regarding the structure and operation of the machine learning classifier are provided below with reference to FIG. 7.

In Step 504, a second fraud indicator is obtained based on the features obtained in Step 500, using a rule-based classifier. The rule-based classifier may include one or more rules operating on one or more of the features to decide whether the transaction under consideration is fraudulent. If multiple rules are used, they may be structured in sequential order such as in a set of "if-then" rules. These rules may form a decision tree. After traversing the decision tree (or more generally, the set of rules), a classification of the transaction under consideration as either fraudulent or non-fraudulent may be available. In a financial transaction, such a set of rules may be: If the payer is located in a particular geographical region, the likeliness of fraud is high, and therefore a second rule needs to be invoked. The second rule may be: If the transaction amount is above a specified threshold, assume that the transaction under consideration is fraudulent. These rules may have been previously established by an administrator based on a recent observation that transactions above the specified amount, when the payer is located in the geographical region, are frequently fraudulent.

In Step 506, a fraud prediction is obtained based on the first and the second fraud indicators. More specifically, both the first and the second fraud indicators are considered when making the final determination regarding whether the transaction under consideration is fraudulent. In one embodiment of the disclosure, the first fraud indicator, obtained by the machine learning classifier is considered first. A low, previously specified threshold is used to determine whether the transaction under consideration is fraudulent. For example, the threshold may be set to 60%, such that fraud is indicated by the first fraud indicator as soon as the likeliness of fraud, computed by the machine learning classifier, reaches 60%. While this low threshold may ensure that most or all fraudulent transactions are caught, it may also result in a significant number of false positives (i.e., classifying a non-fraudulent transaction as fraudulent). Accordingly, the second fraud indicator may be considered, in addition. Only if the second fraud indicator also suggests that the transaction under consideration is fraudulent, the final conclusion may be that the transaction under consideration is fraudulent. In contrast, if the second fraud indicator suggests that the transaction under consideration is not fraudulent, the final conclusion may be that the transaction under consideration is not fraudulent. Accordingly, the combination of the first and the second fraud indicators increases the accuracy of the fraud prediction. False positives are reduced while avoiding an increase of false negatives.

In Step 508, an action is taken in response to the fraud prediction of Step 506. If it is concluded that the transaction under consideration is non-fraudulent, the transaction may be allowed to proceed. If it is concluded that the transaction under consideration is fraudulent, the transaction may be blocked, the transaction may be flagged, and/or the transaction may be referred to a human supervisor for further analysis.

Turning to FIG. 6, additional details regarding the obtaining of transaction-related features are provided.

In Step 600, user agent-related features are obtained. User agent-related features may include any type of feature that can be obtained from the user agent, e.g., from a web client or a portable device application accessed by the unknown transaction party responsible for the transaction under consideration. Various examples for user agent-related features for a scenario in which the transaction is a payment are provided in FIG. 4. User agent-related features may be obtained by a browser extension or portable device application executing on the device used by the unknown transaction party.

In Step 602, transaction request-related features are obtained. Transaction request-related features may include any type of feature that can be extracted from a transaction request. In the example of a financial transaction, the transaction request may be an invoice to be paid, and the transaction request-related features may, thus, be invoice-related features. Examples for invoice-related features are provided in FIG. 4. Transaction request-related features may be obtained from the system that issued the transaction request. In the example of a financial transaction, such a system may be a payment portal, or an invoicing and/or accounting system.

In Step 604, transaction execution-related features are obtained. Transaction execution-related features may include any type of feature that can be extracted from the data provided by the unknown transaction party. In the example of a financial transaction, the data provided by the unknown transaction party may include payment data, i.e., payment-related features. Examples for payment-related features are provided in FIG. 4. Payment-related features may be obtained in various ways. For example, the payment-related features may be obtained by the previously described browser extension or portable device application executing on the device used by the unknown transaction party. Alternatively, the payment-related features may be obtained by a payment portal that receives the payment-related features submitted by the unknown transaction party.

In Step 606, clickstream data is obtained. Clickstream data may include any data documenting actions of the unknown transaction party, such as the time spent on a particular web page, whether payment information is manually entered, or alternatively whether a copy & paste operation is used, etc. Examples for clickstream data are provided in FIG. 4. Clickstream data may be obtained by a browser extension or portable device application executing on the device used by the unknown transaction party.

Turning to FIG. 7, a method for training the machine learning classifier, in accordance with one or more embodiments of the disclosure, is shown. The training may be performed prior to the use of the machine learning classifier as described in FIG. 5. The training may further be performed at a later time, e.g., to accommodate evolving patterns of fraud.

In Step 700, historical transactions are retrieved from a transaction database. The historical transactions may include fraudulent transactions and the historical features that were obtained for these fraudulent transactions. The historical transactions may also include non-fraudulent transactions and the historical features that were obtained for these non-fraudulent transactions. Whether a historical transaction was considered fraudulent or non-fraudulent may be indicated by a label.

In Step 702, the machine learning classifier is trained using the historical features and the historical labels. The training may, thus, be performed using supervised learning methods. Broadly speaking, the machine learning methods used for training the machine learning classifier may be based on optimization algorithms that operate on a suitable loss function to minimize that loss function over a function space of the machine learning classifier, typically in an iterative manner, in a negative gradient direction. The loss function may be selected to minimize the prediction error. Different optimization goals may be selected though, when choosing an appropriate loss function. For example, one may want to minimize the overall prediction error, false positives, false negatives, etc. The exact implementation of the optimization algorithm may also depend on the chosen predictive model, the type of features being used as inputs to the model, the number of features to be considered, etc.

If a random forest classifier is used as the machine learning classifier, operations are performed to establish the trees of the random forest, e.g., by arranging historical features obtained for the historical transactions into subsets that form nodes of decision trees, and with the binary outcomes forming leaves of the decision trees. The random forest may be trained using a gradient boosting algorithm. The gradient boosting algorithm may turn an initially weak learner (e.g., a single tree with a relatively poor predictive accuracy) into a stronger learner (e.g., a random forest that includes multiple trees, and that has a higher predictive accuracy). The gradient boosting is performed stage-wise, with a new weak learner (i.e. another tree) added at each stage. The gradient boosting may be performed using a loss function, e.g., a logarithmic loss function, when performing classifications. Using the loss function, a weak learner (i.e. a single tree) is established in an attempt to minimize the loss function by obtaining a maximum predictive accuracy by the weak learner. When progressing through the stages of learning, trees are added one at a time, and a gradient descent procedure is used to minimize the loss when adding these trees. After calculating the loss for an existing tree or set of trees, another tree is added to reduce the loss using the gradient descent procedure, (i.e., following the gradient). The tree being added is parameterized (e.g., by selecting features to be used in the tree) to reduce the residual loss.

If an XGBoost classifier is used as the machine learning classifier, operations are performed to iteratively learn weak classifiers and add them to form a final strong classifier. XGBoost is a gradient boosting-based implementation of random forests. The training of the XGBoost classifier may be performed iteratively to optimize the chosen loss function. During the training, the parameters of the predictive model (which, in the case of the XGBoost classifier, is formed by an ensemble of trees) may be determined. The XGBoost classifier supports different loss functions, and accordingly, the mean squared error loss, a logistic loss, a weighted logistic loss, etc., may be used for training. At each iterative step of the training, one tree of the tree ensemble may be optimized. Subsequently, a tree ensemble may be obtained by additive combination of these trees.

Training the machine learning classifier may further include additional steps. Prior to the training of the machine learning classifier, the historical transactions may be sampled to obtain training data and validation data. Training data and validation data may be obtained based on a ratio. For example, 80% of the historical transactions may be used as training data and 20% of the historical transactions may be used as validation data. The selection of training data and validation data may be performed pseudo-randomly. Further, the historical transactions may also be sampled to obtain a certain ratio of historical transactions labeled as fraudulent vs historical transactions labeled as non-fraudulent.

As previously noted, the training of the machine learning classifier may be performed iteratively. After training the machine learning classifier based on training data, the trained machine learning classifier may be assessed using the validation data to determine the accuracy of the machine learning classifier. The training of the machine learning classifier may also involve the tuning of hyperparameters. After adjusting one or more hyperparameters of the machine learning classifier, the iterative training may be repeated. Cycles of adjusting hyperparameters and training the machine learning classifier may be repeated until satisfactory predictive performance is achieved.

Figure 8A:
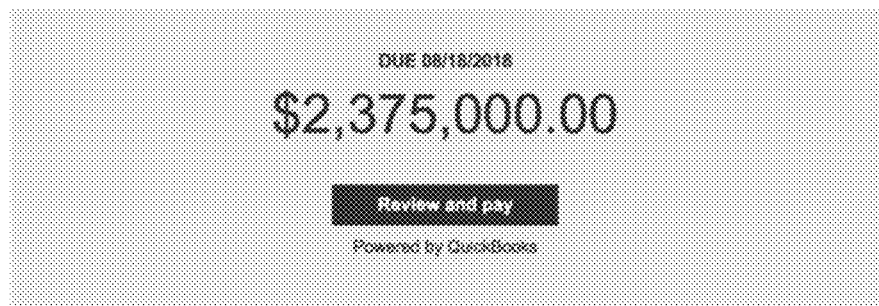
Figure 8B:
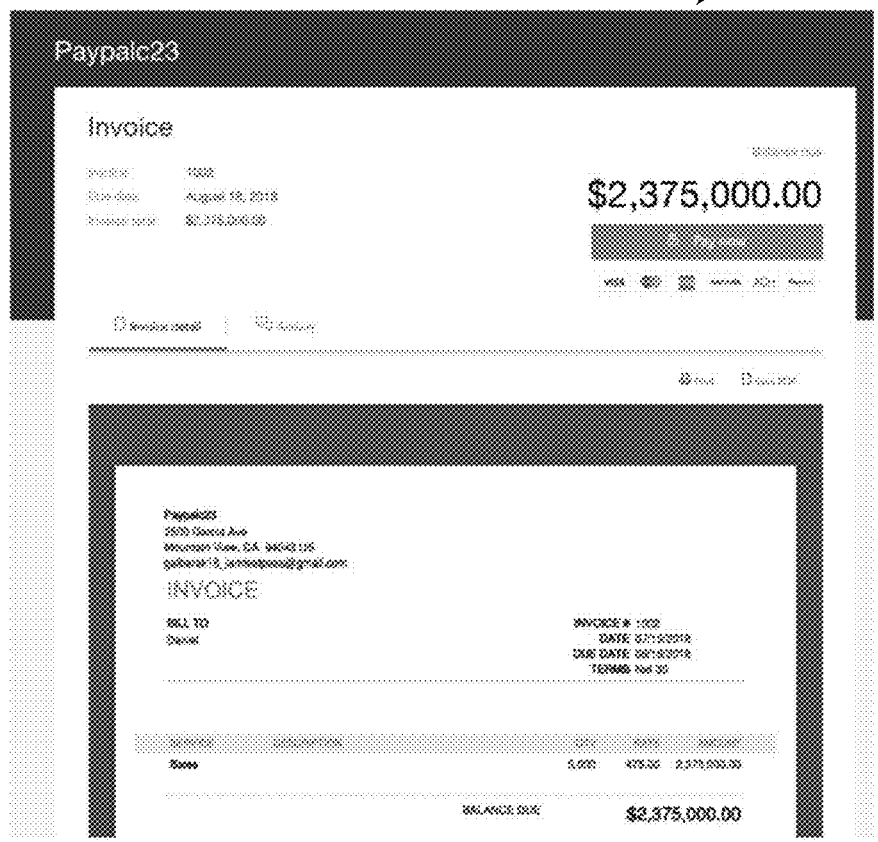
Figure 8C:
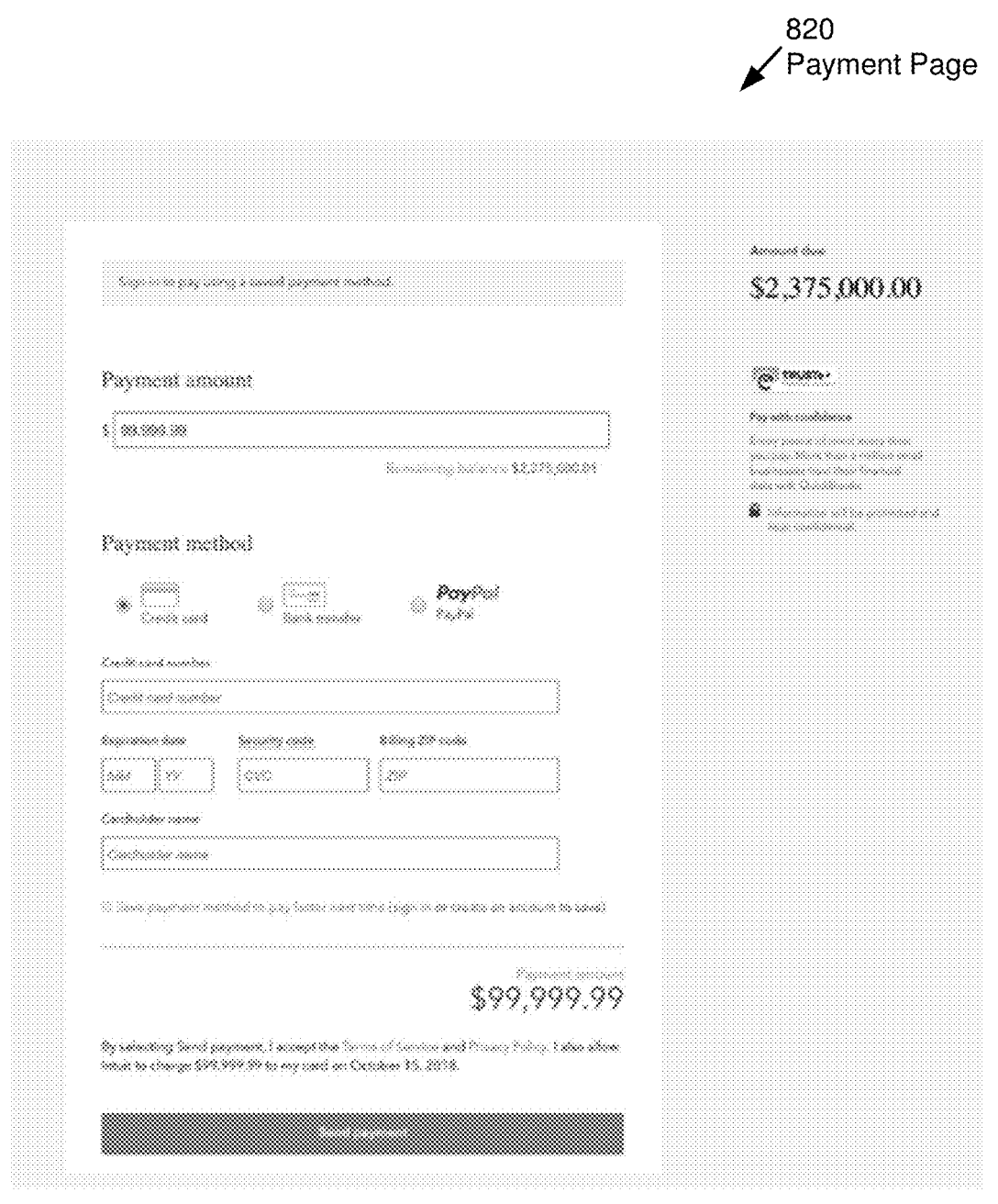

Turning to FIGS. 8A, 8B, and 8C, user interface screens for an example scenario involving a financial transaction are shown. In FIG. 8A, an email notification (800) that includes a request for a payment is shown. The email may have been provided to the unknown transaction party. The email includes a link "Review and pay" which, when selected, guides the unknown transaction party to a landing page, illustrated in FIG. 8B. In FIG. 8B, the landing page (810) is shown. The landing page may be displayed in a browser window or portable device application window and shows an invoice, including invoice details. The landing page includes a link "Pay now" which, when selected, guides the unknown transaction party to a payment page, illustrated in FIG. 8C. In FIG. 8C, the payment page (820) is shown. The payment page may also be displayed in a browser window or portable device application window and provides input fields allowing the unknown transaction party to provide payment information. While not shown in FIG. 8C, the interactions of the unknown transaction party with the payment page (820) may be tracked to obtain clickstream data. For example, the clickstream data may specify whether a credit card number was typed or whether the credit card number was inserted using a copy & paste operation. Once the unknown transaction party selects "Send payment", the payment is submitted for processing by the methods described with reference to FIGS. 5 and 6.

Various embodiments of the disclosure have one or more of the following advantages. Embodiments of the disclosure enable the detection of fraudulent transactions in information technology networks, thereby increasing the security and trustworthiness of computing systems and networks. In particular, a machine learning classifier and a rule-based classifier complement each other to provide superior detection of fraudulent transactions. The machine learning classifier may assess a vast number of features and may be trained using machine learning algorithms. In contrast, the rule-based classifier may assess fewer features and may be set up based on human expertise. Accordingly, the machine learning classifier and the rule-based classifier provide complementary fraud assessment results which, in combination, result in a superior detection of fraudulent transactions, in accordance with one or more embodiments. The rate of false negatives and/or false positives may be reduced.

Further, embodiments of the disclosure do not critically rely on the availability of particular features. Specifically, the machine learning classifier may perform predictions based on the available features, which may change over time with some features no longer being available and other features becoming available. Embodiments of the invention may assess transactions for fraud in real-time and may not require human involvement.

Embodiments of the disclosure may be particularly beneficial for detecting fraudulent financial transactions. Scenarios that involve stolen payment media such as credit cards may be handled, and further scenarios involving fraudulent invoices may also be handled. Both scenarios, when undetected, may cause a middleman processing the transaction significant costs due to possible chargebacks and administrative efforts, which may be avoided using embodiments of the disclosure.

Figure 9A:
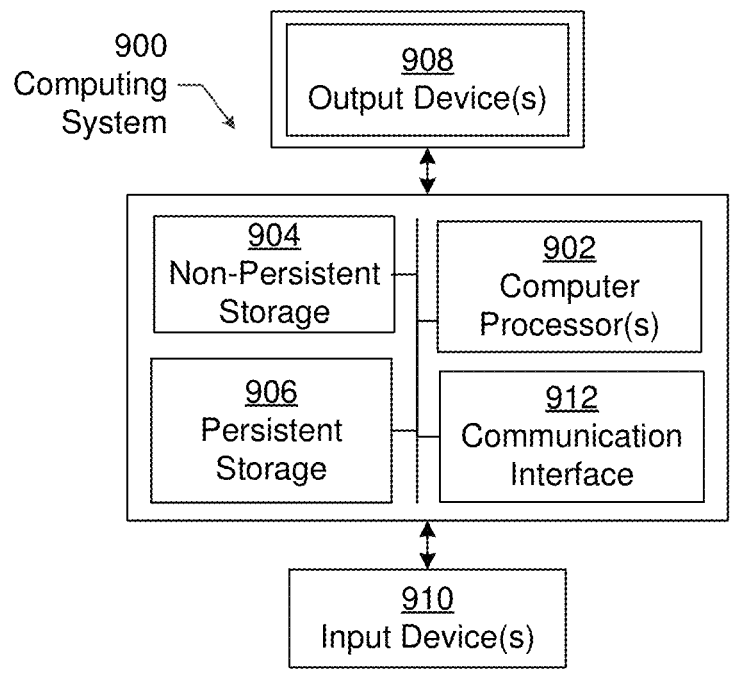
FIGS. 9A and 9B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 9B:
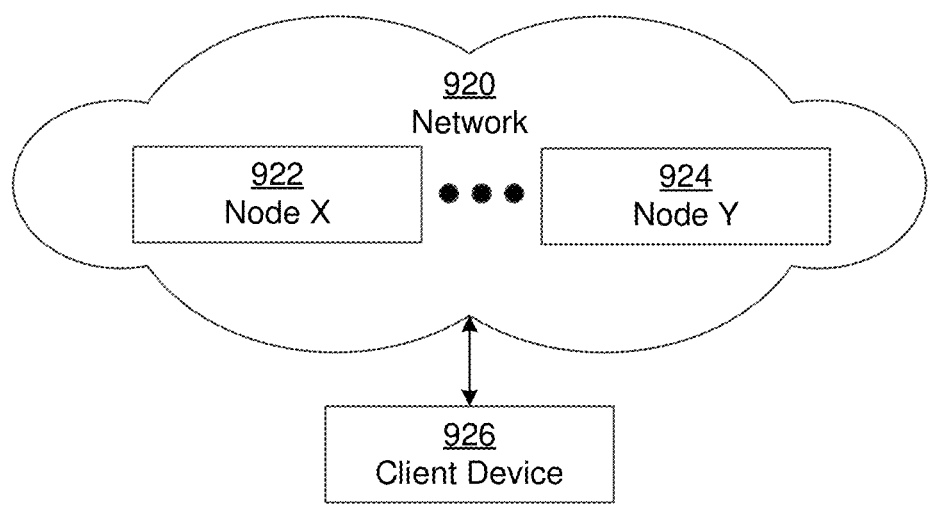

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the disclosure.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 9A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
   obtaining a plurality of features associated with a financial transaction conducted by an unknown transaction party over an information technology network;
   generating a feature vector from the plurality of features;
   computing a first fraud indicator using a machine learning classifier operating on the feature vector;
   computing, responsive to the first fraud indicator indicating that the financial transaction is fraudulent, a second fraud indicator using a rule-based classifier operating on the plurality of features;
   generating a fraud prediction that the financial transaction is fraudulent only when both the first fraud indicator and the second fraud indicator predict that the financial transaction is fraudulent;
   taking an action, in response to the fraud prediction; and
   prior to the computing of the first fraud indicator, training the machine learning classifier,
   the training comprising:
   retrieving, from a transaction database, a plurality of historical labels and a plurality of historical features associated with a plurality of historical transactions, wherein a subset of the plurality of historical labels indicate that an associated subset of the plurality of historical transactions are fraudulent, and
     using a loss function for the machine learning classifier, minimizing a prediction error of the machine learning classifier being trained on the plurality of historical features and the plurality of historical labels.

2. The method of claim 1, wherein;
   the plurality of features comprises clickstream data, and
   the clickstream data characterizes whether the data of the financial transaction was entered by the unknown transaction party using a copy and paste operation.

3. The method of claim 1, wherein the plurality of features comprises at least one identifier of the information technology network characterizing the unknown transaction party.

4. The method of claim 1, wherein the plurality of features comprises at least one element of an invoice associated with the financial transaction.

5. The method of claim 1, wherein the plurality of features comprises at least one element of a payment associated with the financial transaction.

6. The method of claim 1, wherein taking the action, in response to the fraud prediction, comprises blocking the financial transaction.

7. The method of claim 1, wherein the rule-based classifier comprises at least one rule operating on the plurality of features that are financially based.

8. A system comprising:
   a computer processor;
   a feature collection interface executing on the computer processor configured to:
     obtain a plurality of features associated with a financial transaction conducted by an unknown transaction party over an information technology network, and
     generate a feature vector from the plurality of features; and
   a transaction assessment engine executing on the computer processor configured to:
     compute a first fraud indicator using a machine learning classifier operating on the feature vector,
     compute, responsive to the first fraud indicator indicating that the financial transaction is fraudulent, a second fraud indicator using a rule-based classifier operating on the plurality of features,
     generate a fraud prediction that the financial transaction is fraudulent only when both the first fraud indicator and the second fraud indicator predict that the financial transaction is fraudulent,
     take an action, in response to the fraud prediction, and
     prior to the computing of the first fraud indicator, train the machine learning classifier, wherein the transaction assessment engine executing on the computer processor is further configured to:
     retrieve, from a transaction database, a plurality of historical labels and a plurality of historical features associated with a plurality of historical transactions, wherein a subset of the plurality of historical labels indicate that an associated subset of the plurality of historical transactions are fraudulent, and
     use a loss function for the machine learning classifier to minimize a prediction error of the machine learning classifier being trained on the plurality of historical features and the plurality of historical labels.

9. The system of claim 8, wherein;
   the plurality of features comprises clickstream data, and
   the clickstream data characterizes whether the data of the financial transaction was entered by the unknown transaction party using a copy and paste operation.

10. The system of claim 8, wherein the plurality of features comprises at least one identifier of the information technology network characterizing the unknown transaction party.

11. The system of claim 8, wherein the plurality of features comprises at least one element of an invoice associated with the financial transaction.

12. The system of claim 8, wherein the plurality of features comprises at least one element of a payment associated with the financial transaction.

13. A non-transitory computer readable medium comprising computer readable program code for causing a computer system to:
    obtain a plurality of features associated with a financial transaction conducted by an unknown transaction party over an information technology network;
    generate a feature vector from the plurality of features;
    compute a first fraud indicator using a machine learning classifier operating on the feature vector;
    compute, responsive to the first fraud indicator indicating that the financial transaction is fraudulent, a second fraud indicator using a rule-based classifier operating on the plurality of features;
    generate a fraud prediction that the financial transaction is fraudulent only when both the first fraud indicator and the second fraud indicator predict that the financial transaction is fraudulent;
    take an action, in response to the fraud prediction; and
    prior to the computing of the first fraud indicator, train the machine learning classifier, wherein the computer readable program code further causes the computer system to:
        retrieve, from a transaction database, a plurality of historical labels and a plurality of historical features associated with a plurality of historical transactions, wherein a subset of the plurality of historical labels indicate that an associated subset of the plurality of historical transactions are fraudulent, and
        use a loss function for the machine learning classifier to minimize a prediction error of the machine learning classifier being trained on the plurality of historical features and the plurality of historical labels.

14. The non-transitory computer readable medium of claim 13, wherein:
    the plurality of features comprises clickstream data, and
    the clickstream data characterizes whether the data of the financial transaction was entered by the unknown transaction party using a copy and paste operation.

15. The non-transitory computer readable medium of claim 13, wherein the plurality of features comprises at least one identifier of the information technology network characterizing the unknown transaction party.

16. The non-transitory computer readable medium of claim 13, wherein the plurality of features comprises at least one selected from a group consisting of an element of an invoice associated with the financial transaction and an element of a payment associated with the financial transaction.

17. The method of claim 1, wherein:
    the plurality of features comprises clickstream data,
    the clickstream data is obtained from a user device used by the unknown transaction party to perform the financial transaction, the user device configured to capture the clickstream data,
    the clickstream data documents actions performed by the unknown transaction party on the user device, and
    the clickstream data is associated with data of the financial transaction being entered by the unknown transaction party.

18. The system of claim 8, wherein:
    the plurality of features comprises clickstream data,
    the clickstream data is obtained from a user device used by the unknown transaction party to perform the financial transaction, the user device configured to capture the clickstream data,
    the clickstream data documents actions performed by the unknown transaction party on the user device, and
    the clickstream data is associated with data of the financial transaction being entered by the unknown transaction party.

19. The non-transitory computer readable medium of claim 13, wherein:
    the plurality of features comprises clickstream data,
    the clickstream data is obtained from a user device used by the unknown transaction party to perform the financial transaction, the user device configured to capture the clickstream data,
    the clickstream data documents actions performed by the unknown transaction party on the user device, and
    the clickstream data is associated with data of the financial transaction being entered by the unknown transaction party.

* * * * *